July 21, 1964  P. J. ALLEN  3,142,061
MICROWAVE POLARIZATION RESOLVER
Filed Feb. 14, 1961
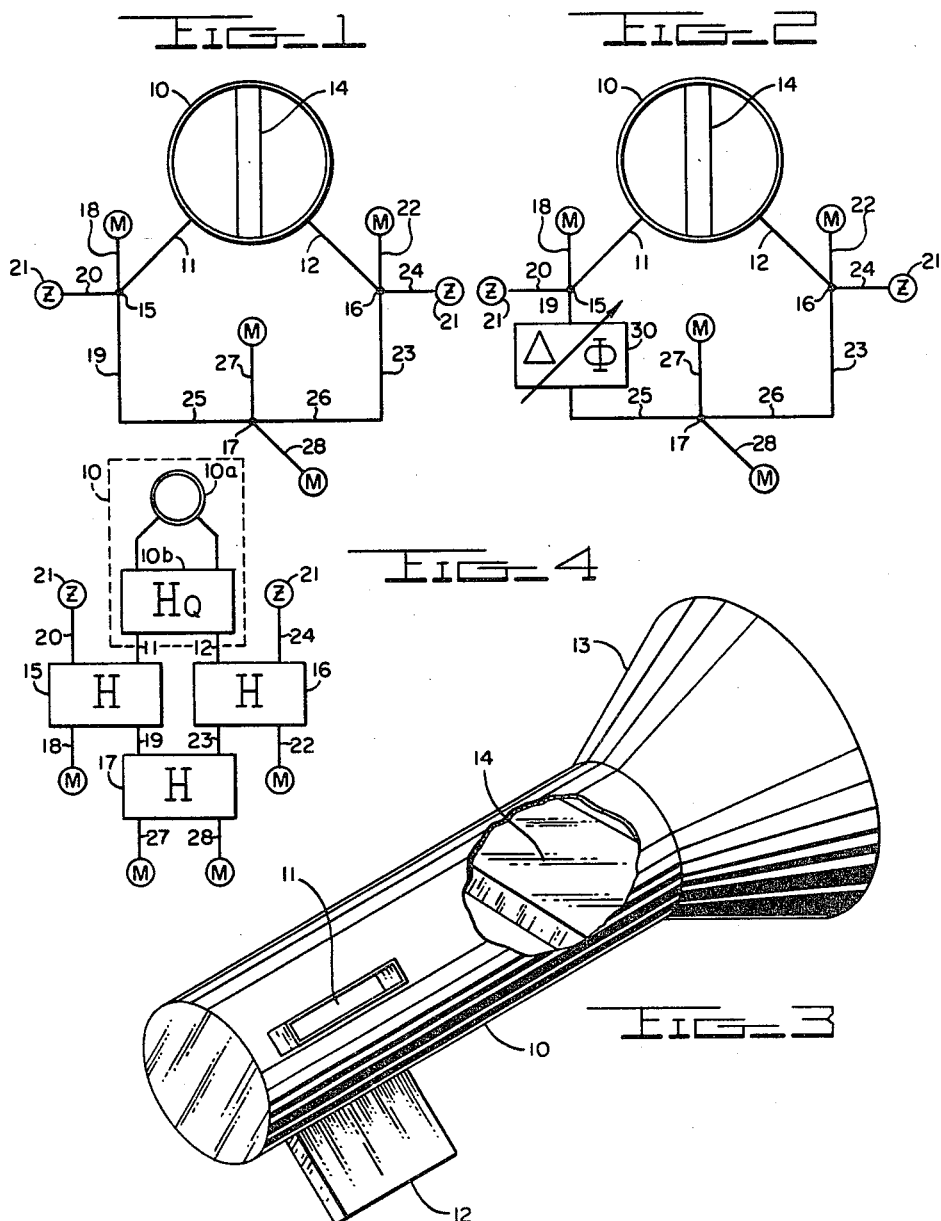
INVENTOR
PHILIP J. ALLEN 3,142,061
MICROWAVE POLARIZATION RESOLVER
Philip J. Allen, 8000 Marion St., North Forestville, Md.
Filed Feb. 14, 1961, Ser. No. 89,328
8 Claims. (Cl. 343—100)
(Granted under Title 35, U.S. Code (1952), sec. 266)

The invention described herein may be manufactured and used by or for the Government of the United States of America for governmental purposes without the payment of any royalties thereon or therefor.

This invention relates to electromagnetic wave operative devices in general and in particular to polarization resolver devices capable of receiving an input signal of any arbitrary polarization and deriving quantities representative of the circular polarization components of the signal as well as quantities representative of the linear polarization components. In my copending application, Serial No. 72,817, filed November 30, 1960, entitled "Polarization Resolver and Mixer," now Patent No. 3,059,186, there is described such a polarization resolver device having highly desirable properties; however, it does require as an essential component a device described as a "turnstile junction." Although a turnstile junction in itself is not particularly difficult to construct or undesirable and in fact has many desirable properties, there may be instances in which it would be desirable, for some reason or another, to obtain results similar to those of the aforementioned application without employing the turnstile junction per se. Accordingly, the device of the present invention provides signal resolving capabilities of the apparatus of the aforementioned application without requiring a turnstile junction.

For various reasons such as measurement purposes it may be desired to analyze an incoming signal to determine the polarization characteristics of that signal. An example of a situation where such information is desirable is in determining the nature of a signal source. By determining the polarization of the received signal, it is possible to ascertain whether or not a distant signal source emits linear polarization or circular polarization, the plane of linear polarization, the sense of circular polarization, and many other characteristics. Where the incoming signal is actually a reflected signal, as may be encountered with a radar device using pulse echo techniques, for example, it is frequently possible to determine the nature of the distant energy reflective object by analyzing the effect that such an object has upon the polarization of the return signal. An isotropic reflecting object such as a flat plate or a sphere will reverse the sense of circularly polarized waves incident thereon, causing thus a specific action which can be identified. To do this it is usually desired to determine if the return signal has been altered in circular polarization sense. Thus it is desired to have a device which will resolve an incoming signal into components at various ports, each having a specific significance as to polarization characteristics of the incoming signal.

It is accordingly an object of the present invention to provide a polarization analyzer which is capable of resolving a signal into various polarization components.

Another object of the present invention is to provide a polarization resolver capable of delivering into four output circuits an analysis of an incoming wave as to sense of circular polarization and linear components in selected orthogonally related planes.

Another object of the present invention is to provide a polarization resolver of the foregoing type which does not require a turnstile junction as a component thereof.

Other objects and many of the attendant advantages of this invention will be readily appreciated as the same becomes better understood by reference to the following detailed description when considered in connection with the accompanying drawings wherein:

FIG. 1 shows schematically apparatus constructed in accordance with the teachings of the present invention employing a circular waveguide dual mode transducer, a quarter wave plate and transmission line junctions.

FIG. 2 shows a variation in the apparatus of FIG. 1 wherein a phase shifter is employed to permit orientation control of the orthogonal linear polarization planes.

FIG. 3 shows a more or less structural representation of the dual mode transducer of FIGS. 1 and 2 and certain associated components.

FIG. 4 shows a variation of apparatus of the preceding figures.

The polarization state of a polarized wave can be defined in terms of the magnitudes of two orthogonally polarized components and the relative phase angle between these two components. For both practical and analytical convenience a polarized wave is usually resolved into either orthogonal linearly polarized components (vertical and horizontal, for example) or opposite sense circularly polarized components (right-hand and left-hand senses, for example). Numerous ways are known in the prior art for resolving a polarized wave into either pair of components; however, in some polarization measurements and applications it is desirable to have both linear and circular components simultaneously and independently available for comparison and other study purposes. The simple microwave polarization resolver of the present invention simultaneously extracts orthogonal linearly polarized, and oppositely-sensed circularly polarized components of an input signal.

With reference now to FIG. 1 in the drawing, the apparatus shown therein in more or less schematic form consists of a dual-mode circularly polarized transducer 10 which contains a section of circular waveguide and a quarter wave plate, the transducer further having quadrature-related output ports for connection to a plurality of transmission line junctions. The action of the quarter wave plate resolves an arbitrarily polarized input signal into positive and negative circularly polarized components which couple to the quadrature-spaced output ports of the dual-mode transducer. First and second junctions connected to the output ports split the signals representing positive and negative circularly polarized components making a fraction of each available at the respective outputs of the junctions. The junction outputs are usable directly as indicative of the circularly polarized components of the input wave while the third junction combines certain of the outputs of the first two junctions to obtain signals indicative of the "vertical" and "horizontal" linearly polarized components of the input signal. In this apparatus the vertical and horizontal planes are at right angles to one another, hence orthogonal, and cannot be varied, however, by the addition of a variable phase shifter to the basic apparatus at an appropriate point such as shown in FIG. 2, it is possible to vary the orientation of these orthogonal planes relative to planes of the ports of the dual-mode transducer.

For greater detail the apparatus of FIG. 1 is indicated in part in a structural type presentation in FIG. 3. The dual-mode transducer 10 as typified is essentially a section of circular waveguide short circuited at one end by means of a suitably attached cover plate and having two rectangular waveguide ports 11 and 12 therein oriented in such manner as to couple to orthogonal linear polarizations of the $TE_{11}$ mode in the circular waveguide portion. As is established practice in the present state of the art, the dual-mode transducer may contain various vanes and pins disposed internally to assist in the impedance match therein and improve the isolation between the various polarization planes and the resolution of internal fields into the orthogonally related output ports. The circular waveguide of the dual-mode transducer 10 extends so as to connect to a conical horn 13, not shown in FIG. 1 but shown in FIG. 3, which provides directivity and optimizes the impedance match of the circular waveguide to whatever medium it may be coupled, such as free space or the ionosphere. Again, the design and configuration of the conical horn 13 is well known in the art, requiring no further elaboration at this point. Disposed in the circular waveguide of the dual mode transducer 10 between the region of the output ports 11 and 12 and the conical horn 13 is a device known in the art as a quarter wave plate, indicated by the numeral 14. The quarter wave plate 14 may be one of a number of different forms, typically it is a simple structure, normally of some dielectric material such as polystyrene, which is of the nature of a plate diametrically disposed within the waveguide and which alters the normal propagation characteristics therein. Specifically, it causes a different propagation velocity in one plane through the waveguide from that in an orthogonally related plane. It is termed a quarter wave plate because of the property possessed thereby of producing a quarter-wavelength shift or a 90-degree alteration in the phase of signals in certain orthogonal planes, thus being capable of converting a circularly polarized wave to linear polarization and vice versa.

When the energy incident upon the quarter wave plate 14 is of a circularly polarized nature, the differential phase shift properties of the quarter wave plate will result in the production of exit energy from the quarter wave plate which is linearly polarized having a 45-degree angular relationship with the reference plane of the quarter wave plate. Thus linearly polarized energy will be available at port 11 or port 12 in response to incident circularly polarized energy, the energy being realized at either port 11 or 12 depending upon whether the incident energy was left hand circularly polarized or right hand circularly polarized.

It is well known that any polarized wave can be resolved into circularly polarized components of opposite senses. Thus an arbitrarily polarized signal entering the conical horn 13 and incident on the quarter wave plate 14 will be resolved into two linearly polarized components because of the action of the quarter wave plate. One of these components corresponding to the right circularly polarized content of the incident wave will couple out port 11, while the other component corresponding to the left circularly polarized content of the incident wave will couple out port 12. The relative magnitudes of these two components is determined by the axial ratio of the input polarized wave, and their relative phase is determined by the spatial orientation of the polarized wave relative to the arrangement of quarter wave plate and ports 11 and 12 of the dual mode transducer 10. Thus, by measuring the relative amplitude and phase of the components out of ports 11 and 12, the state of polarization of the wave entering the horn 13 can be defined.

With signals derived at the output ports 11 and 12 in the apparatus of FIGS. 1 and 3 according to the foregoing description in dependency upon the nature of the polarization of incident signals, combination and sampling of these signals according to a particular plan can yield output signals which are independent and which indicate in their independency the components of signals in the horizontal and vertical linearly polarized planes as well as the components of circularly polarized signals and their appropriate sense of polarization. The three junctions identified in FIG. 1 by the numerals 15, 16 and 17 provide for the combination in an appropriate manner of the output signals from ports 11 and 12.

Each of the junctions 15, 16 and 17 of FIG. 1 may be typified as being junctions of the well-known magic-T type, the connecting lines indicated in the schematic being normally rectangular waveguides of dimensions appropriate to support the dominant mode at the frequency of the energy being propagated therein. The junctions, to described the junction 15 specifically for the present, are normally 3-db type junctions in that input power to an appropriate input line thereof is split equally between two output lines with the outputs being either in phase or in phase opposition depending upon the plane of the junction, with no energy reaching a fourth line thereof. With the junction 15 being of the typified magic-T variety, the line therefrom leading to port 11 is one of the side arms of the junction and the lines identified by the numerals 18 and 19 are the straight-through or collinear arms of the junction, the ones which receive the power in this case from port 11 in equal amounts. Actually, either the H-plane or the E-plane side arm of the magic-T could be connected to port 11. The lines 18 and 19 will receive equal amplitude signals each being half of the power obtained from port 11 of the dual-mode transducer. The fourth port or terminal of the junction identified by the numeral 20 is, ideally, isolated from the port leading to the dual-mode transducer since it couples to a different plane in the hybrid, and hence is of no particular significance in the present apparatus; however, it is to be noted that this port provides an arrangement for locating a matched terminating load 21 or Z whereby undesired signals existing in the junction region as a result of unbalance in the circuit can be absorbed. It is thus to be understood that, although the junctions 15 and 16 have been referred to typically as being of the magic-T type, under certain conditions they could be merely T devices with the fourth terminal 20 omitted.

The junction 16 is, for all practical purposes, normally identical to the previously described junction 15 deriving from input at port 12 equal amplitude signals in the lines 22 and 23 with fourth lines thereof being provided in the magic-T case and identified by numeral 24 which is normally terminated in a matched impedance 21 to provide absorption of energy existing therein due to unavoidable impedance mismatches occurring in the circuit.

The output lines 19 and 23 of the junctions 15 and 16 are connected to a third junction 17 which, in this instance, is shown as a magic-T type having two straight-through (collinear) arms 25 and 26 together with the side arms 27 and 28. Signals existing in both lines 25 and 26 and applied to junction 17 will be either additive or subtractive at each of the side lines 27 and 28, depending upon their relative phasing. For example, a vertically polarized signal incident on the dual-mode transducer in the plane of the quarter wave plate, as shown in FIG. 1, will normally excite arbitrarily designated in-phase signals at ports 11 and 12. These signals will be delivered through the junctions 15 and 16 to appear as in-phase signals at input arms 25 and 26 of the junction 17. These signals will be additive in the H-plane arm and if this is selected as 27, then this line 27 will contain the output signal corresponding to a vertically polarized signal input to the dual mode transducer. On the other hand, an incident horizontally polarized signal at the dual mode transducer 10 will similarly excite arbitrarily designated out-of-phase signals at the ports 11 and 12 delivering out-of-phase signals at the lines 25 and 26 of junction 17 which will be additive in the E-plane arm of the hybrid 17 to appear in the output line 28 if that corresponds to the E-plane arm of the junction 17.

It is, of course, apparent that considerable variation in the arrangement and the additive and subtractive action upon the signals in the junction 17 is possible, depending upon the types of junctions used and the manner of connection of the other junctions 15 and 16 as well as that of the junction 17 itself. Thus it is to be understood that the previous discussion is exemplary and typical of a particular arrangement that provides desirable results and not necessarily the only arrangement whereby the basic components of the present apparatus could be combined to achieve desirable results.

An example of the variations possible in the apparatus of FIG. 1 is that shown in FIG. 2 which, in general, corresponds to the previously described FIG. 1 containing, in addition, a component 30 which is indicated as a phase shifter. This phase shifter, in general, would be variable; however, it is to be understood that in certain applications it may be entirely adequate and satisfactory to employ a fixed phase shifter at this point or even to employ merely a difference in the path length between 15 and 17 and that between 16 and 17. Be that as it may, although the vertical and horizontal planes are always orthogonally related, their orientation relative to the quarter wave plate of the dual mode transducer is a function of the relative phase between the components in the lines 25 and 26 reaching junction 17. The variable phase shifter 30 of FIG. 2 provides a means of varying the phase relationship of these components entering the junction 17 and, hence, simultaneously changing the orientation of the "vertical" and "horizontal" planes.

The apparatus described in the preceding discussion is reciprocal in that it can be used to extract the components of incident received signals or to control the polarization of transmitted signals. Furthermore simultaneous transmission and reception is possible with the transmitter connected as subsequently described since the various ports 18, 22, 27, 28 are isolated from each other. Normally various receivers or meters M would be attached to the lines 18, 22, 27 and 28 to measure the amplitudes of the right hand circular polarization component, the left hand circular polarization component, the "vertical" polarization component, and the "horizontal" polarization component, respectively, of an incoming signal. On transmission it would be possible, for example, to attach a transmitter to any one of these lines in place of the associated meter M to achieve a corresponding output wave polarization. Additionally, it would be possible to connect a single transmitter to several of these connection lines simultaneously with various devices for controlling the amplitude and phase relationships of the signals to the various lines to achieve intermediate forms of polarization characteristics. Normally, in such situations, any ports which are unused would be terminated in a matching impedance to avoid undesired reflections within the system and the effect that such would have upon the polarization of the output.

FIG. 4 is a generalized presentation of further arrangements of the basic apparatus of the invention, reference characters corresponding to those previously used. The junctions 15, 16 and 17 are indicated in block form only whereas a different arrangement for the dual mode circularly polarized transducer 10 is shown. Rather than the dual mode coupler plus quarter wave plate arrangement of prior figures, the substantially equivalent arrangement of a dual mode transducer 10-a and a quadrature 3-db hybrid junction 10-b is shown. Typically such a junction would be a short slot directional coupler which is characterized by producing power division of input signals from each line connected to the dual mode transducer to each out of the output lines 11 and 12 in 3-db power relationship and 90 degree phase relationship.

Obviously many modifications and variations of the present invention are possible in the light of the above teachings. It is therefore to be understood that within the scope of the appended claims the invention may be practiced otherwise than as specifically described.

What is claimed is:

1. An electromagnetic wave operative device comprising, a dual mode circularly polarized transducer having two orthogonally related coupling ports, means for coupling the transducer to an electromagnetic wave propagational medium, first and second selective power coupling devices connected to the first and second coupling ports, respectively, and a third selective power coupling device connected to said first and second selective power coupling devices.

2. An electromagnetic wave operative device comprising, a dual mode circularly polarized transducer having two orthogonally related coupling ports, means for coupling the transducer to an electromagnetic wave propagational medium, first and second selective power coupling devices each having ports identified as intermediate port and utilization port whereby each transducer port is coupled in equal impedance to the intermediate port and the utilization port of the respective power coupling device, a third selective power coupling device having first and second ports connected to the intermediate ports of the first and second selective power coupling devices, said third selective power coupling device having third and fourth ports, the third port coupling in phase to the first and second power coupling devices, the fourth port coupling to the first and second power coupling devices with relative phasing of 180-degrees.

3. An electromagnetic wave operative device comprising, a dual mode coupler having two orthogonally related ports, means for coupling the transducer to an electromagnetic wave propagational medium, a quarter wave plate disposed within the energy path between the orthogonally related ports and the propagational medium, said plate disposed symmetrically with respect to said ports, first and second selective power coupling devices each having ports identified as intermediate port and utilization port whereby each transducer port is coupled in equal impedance to the intermediate port and the utilization port of the respective power coupling device, a third selective power coupling device having first and second ports connected to the intermediate ports of the first and second selective power coupling devices, said third selective power coupling device having third and fourth ports, the third port coupling in phase to the first and second power coupling devices, the fourth port coupling to the first and second power coupling devices with relative phasing of 180 degrees.

4. An electromagnetic wave operative device comprising, a dual mode circularly polarized transducer having two orthogonally related coupling ports, means for coupling the transducer to an electromagnetic wave propagational medium, first and second selective power coupling devices each having ports identified as intermediate port and utilization port whereby each transducer port is coupled in equal impedance to the intermediate port and the utilization port of the respective power coupling device, a quadrature directional coupler disposed between the transducer ports and the first and second selective power coupling devices whereby each power coupling device is coupled to each transducer port in equal power ratio and 90-degree phase relationship and vice versa, a third selective power coupling device having first and second ports connected to the intermediate ports of the first and second selective power coupling devices, said third selective power coupling device having third and fourth ports, the third port coupling in phase to the first and second power coupling devices, the fourth port coupling to the first and second power coupling devices with relative phasing of 180 degrees.

5. An electromagnetic wave operative device comprising, a dual mode circularly polarized transducer having two orthogonally related coupling ports, means for coupling the transducer to an electromagnetic wave propagational medium, first and second selective power coupling devices each having ports identified as intermediate port and utilization port whereby each transducer port is coupled in equal impedance to the intermediate port and the utilization port of the respective power coupling device, a third selective power coupling device having first and second ports connected to the intermediate ports of the first and second selective power coupling devices, said third selective power coupling device having third and fourth ports, the third port coupling in phase to the first and second power coupling devices, the fourth port coupling to the first and second power coupling devices with relative phasing of 180 degrees, and measurement means connected to at least one port of a group of ports consisting of the intermediate ports and the third and fourth ports.

6. An electromagnetic wave operative device comprising, a dual mode circularly polarized transducer having two orthogonally related coupling ports, means for coupling the transducer to an electromagnetic wave propagational medium, first and second selective power coupling devices each having ports identified as intermediate port and utilization port whereby each transducer port is coupled in equal impedance to the intermediate port and the utilization port of the respective power coupling device, a third selective power coupling device having first and second ports connected to the intermediate ports of the first and second selective power coupling devices, said third selective power coupling device having third and fourth ports, the third port coupling in phase to the first and second power coupling devices, the fourth port coupling to the first and second power coupling devices with relative phasing of 180 degrees, and a source of electromagnetic wave energy connected to at least one port of a group of ports consisting of the intermediate ports and the third and fourth ports.

7. An electromagnetic wave operative device comprising, a dual mode circularly polarized transducer having two orthogonally related coupling ports, means for coupling the transducer to an electromagnetic wave propagational medium, first and second selective power coupling devices each having ports identified as intermediate port and utilization port whereby each transducer port is coupled in equal impedance to the intermediate port and the utilization port of the respective power coupling device, a third selective power coupling device having first and second ports connected to the intermediate ports of the first and second selective power coupling devices, said third selective power coupling device having third and fourth ports, the third port coupling in phase to the first and second power coupling devices, the fourth port coupling to the first and second power coupling devices with relative phasing of 180 degrees, measurement means, and a source of electromagnetic wave energy, each of said measurement means and said source connected individually to at least one port of a group of ports consisting of the intermediate ports and the third and fourth ports.

8. An electromagnetic wave operative device comprising, a dual mode circularly polarized transducer having two orthogonally related coupling ports, means for coupling the transducer to an electromagnetic wave propagational medium, first and second selective power coupling devices each having ports identified as intermediate port and utilization port whereby each transducer port is coupled in equal impedance to the intermediate port and the utilization port of the respective power coupling device, a third selective power coupling device having first and second ports connected to the intermediate ports of the first and second selective power coupling devices, said third selective power coupling device having third and fourth ports, the third port coupling in phase to the first and second power coupling devices, the fourth port coupling to the first and second power coupling devices with relative phasing of 180 degrees, and relative phase shift control means disposed in at least one of the connections of the third selective power coupling device to the first and second selective power coupling devices.

References Cited in the file of this patent
UNITED STATES PATENTS

| | | |
|---|---|---|
| 2,619,635 | Chait | Nov. 25, 1952 |
| 2,991,471 | Pritchard | July 4, 1961 |

FOREIGN PATENTS

| | | |
|---|---|---|
| 750,600 | Great Britain | May 26, 1952 |

OTHER REFERENCES

Chait: "Microwave Radar Antenna," published in Electronics, March 1951.